June 10, 1947.                C. N. BOYD                2,421,827
                       APPARATUS FOR REPRODUCING SHAPES
                           Filed Aug. 20, 1943
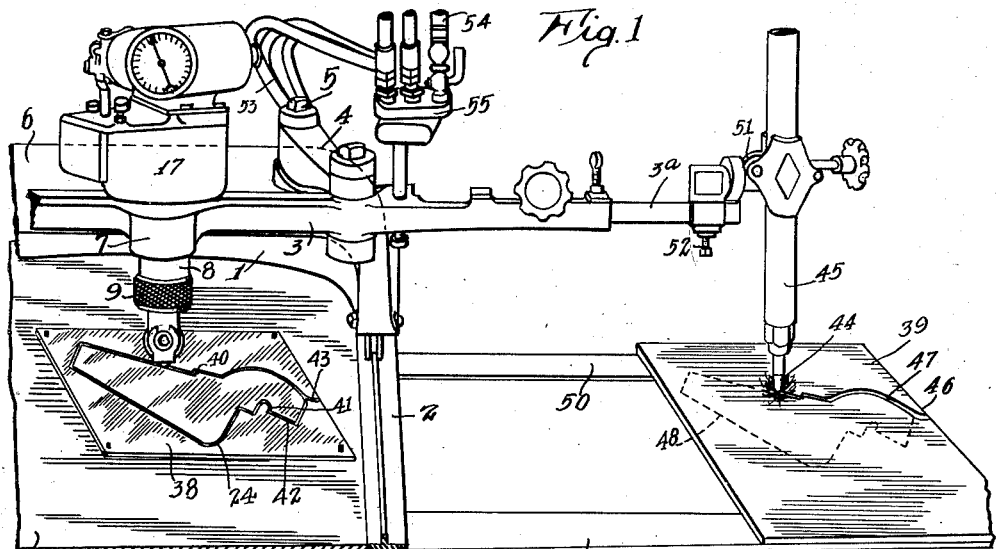
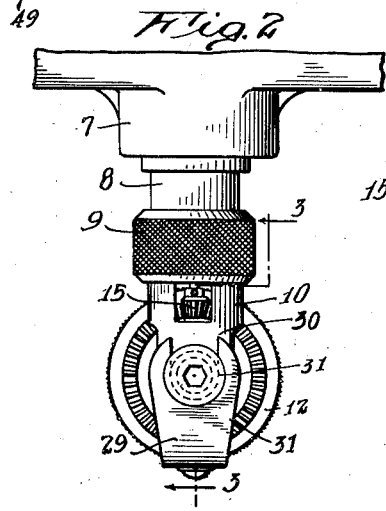
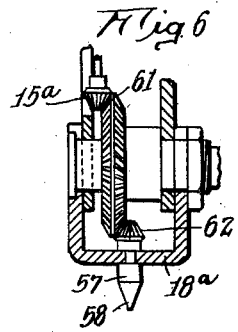
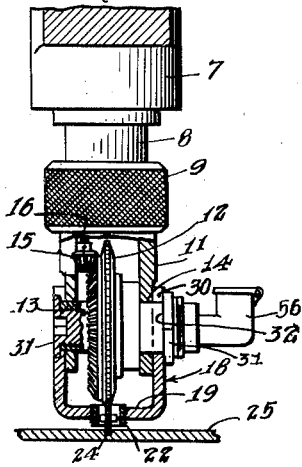
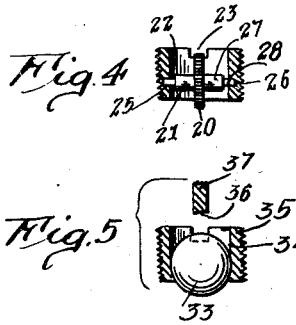
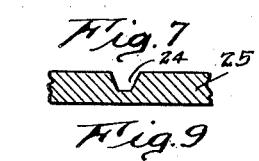
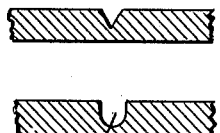
Inventor
Carl N. Boyd
By Lyon & Lyon
Attorneys Patented June 10, 1947

2,421,827

UNITED STATES PATENT OFFICE 2,421,827

APPARATUS FOR REPRODUCING SHAPES

Carl N. Boyd, Hollydale, Calif.

Application August 20, 1943, Serial No. 499,371

3 Claims. (Cl. 33—23)

1

This invention relates to an apparatus for guiding a tracer point or thermal cutting element through the agency of a pantograph or parallel motion apparatus. In apparatus of this kind, the pantograph element is usually controlled by a follower which is moved along a predetermined path on a templet, and this controls the movement of the tracer or thermal element.

It has been customary heretofore to provide a bar of metal that is bent to the desired shape and secured on the upper face of a plate. This bar must have considerable thickness, and hence it is impractical to bend it to a small radius or to form jogs or shoulders of small dimension in the same to reproduce a small radius or a small offset or jog in the part being traced or cut out from a plate or bar by the thermal element.

An object of the present invention is to provide a means for overcoming this difficulty, and to provide a means the use of which will enable a templet to be formed which may have relatively small shoulders or jogs in it, and in which the line of travel of the follower may include arcs disposed on relatively short radii. The advantage of this is that with this apparatus of my invention a templet can be formed accurately representing an outline having relatively minute offsets and curves which will enable a machine part to be cut from a metal plate or bar to the exact dimensions of the "job," that is, the part being formed, so as to avoid the necessity for finishing the blank as cut out from the metal by the thermal element.

As ordinarily constructed, the follower on machines of this type consists of a wheel which runs along on the upper side of the templet bar referred to above, and which is maintained in contact with the bar through the agency of a shoe or saddle that slides along on the upper side of the bar. This disc or wheel is driven to give a predetermined speed of movement to the follower, which usually is as high as possible consistent with the burning time or "cutting" time of the thermal element.

One of the objects of my invention is to provide a simple construction to cooperate with this driven follower disc or wheel which will enable the same to cooperate with a groove in a templet, which groove can be formed with relatively small arcs and relatively small offsets or jogs along which the follower can travel and effect a very accurate reproduction of the same in the movements of the thermal element. Under some circumstances, it is not necessary to provide a drive for the follower point that runs along in the

2 guide groove of the templet, and in such a situation my novel templet may be constructed so as to cooperate with a follower having a pointed tip that will run in the groove of the templet.

Further objects of the invention will appear hereinafter.

A preferred embodiment of the invention is described in the following specification, while the broad scope of the invention is pointed out in the appended claims.

In the drawings:

Figure 1 is a perspective of a pantograph apparatus or parallel movement apparatus, with certain parts broken away, and illustrating one of my novel templets as though in operation to control a thermal cutter to cut out a machine part from a metal plate while being controlled by the figure embodied in the templet.

Figure 2 is a side elevation of the follower embodying my invention, and particularly adapted to cooperate with the templet of my invention. The upper portion of this view shows a portion of the control arm of the cutting machine.

Figure 3 is a vertical section in partial elevation taken about on the line 3—3 of Figure 2.

Figure 4 is a section upon an enlarged scale showing a follower "tip," such as illustrated in Figure 3 and showing the same removed from its support.

Figure 5 is a view similar to Figure 4, but illustrating another embodiment of a tip to function in a manner similar to the manner in which the tip shown in Figure 4 functions. This view includes the lower edge of the driving disc in the relation which it would have to the tip when these parts are being assembled in the follower construction.

Figure 6 is a section similar to Figures 3 and 5, but illustrating another embodiment of the tip or point to run in the templet groove, and this view shows in section a small part of the support for the tip.

Figures 7, 8, 9, 10 and 11 are fragmentary sectional views showing cross-sections of different forms of grooves which may be used in the templet as may be desired to cooperate with different types or designs of follower tips.

In Figure 1 I illustrate a conventional type of pantograph or parallel movement apparatus constituting the pantographic element of a metal cutting machine of usual design. This machine includes a carriage 1 that is movable along a track, one rail 2 of which is illustrated in Figure 1. On this carriage a control bar 3 is mounted, said control bar being supported on parallel arms, such as the arm 4, which is pivoted at 5 to shift laterally on a vertical axis. At about the middle point of the control bar 3, that is to say, at a point about midway between the arm 4 and its opposite arm, this bar supports a follower 6 at the lower end of a boss or hub 7 that may be formed integrally with the control bar 3, as illustrated. At the lower end of the boss 7 a sleeve or short tubular connection 8 is provided, on which the upper end of the follower 6 is supported at a swivel connection, not illustrated, and including a "nut" or knurled collar 9 which can be grasped in one's hand to rotate the follower on the vertical axis of the tubular connection or sleeve 8. The follower as usually constructed includes two oppositely disposed forks 10 and 11 which extend down from the knurled collar 9, and on these forks a driving disc 12 is mounted to rotate, said disc being carried on an arbor 13, the ends of which are supported in round holes or openings 14 formed in the two forks 10 and 11. The wheel or disc 12 is usually driven at a certain definite computed speed, depending upon the rate at which the thermal element can cut through the metal stock, and this drive is effected through the agency of a beveled gear 15 carried on the lower end of a small countershaft 16 that extends through the sleeve 8 and which is driven at a desired speed from a motor 17 mounted on the upper side of the control arm 3.

In adapting my invention to a machine constructed as described, I provide a rider 18 which is supported on forks 10 and 11 or on the arbor 13 so as to extend down below the same, and this rider is formed with an extension or substantially horizontal bar 19 in which I mount a diminutive runner that is to run in the groove that I provide in the templet which is to control the follower. As illustrated in Figures 3 and 4, this runner is in the form of a small wheel or disc 20 which is mounted on an arbor 21, the ends of which are rotatably mounted in a cage or threaded sleeve 22 that is threaded in the bar 19. The edge of this disc is preferably serrated or toothed so as to mesh with similar serrations or teeth formed on the periphery of the disc 12. In order to provide clearance for the edge of the disc 12, the ferrule 22 is provided at two diametrically opposite points with notches 23. The lower edge of the small disc 20 projects below the lower end of the ferrule 22, and this enables it to run in the groove 24 of the templet 25 (see Figure 3).

In order to enable the runner 20 to be assembled into the ferrule or ring 22, I prefer to drill into the ferrule on a diametrical line, the drill passing on one side to form a bearing opening 25 for the arbor and forming a blind hole 26 on the other side. The arbor 21 is composed of a hub 27 that projects out from each side of the disc 20 so as to center the same in line with the notches 23, and after the disc 20 is put in place the pin 28 is driven through the bearing opening 25 and through a drill hole in the hub portion 27 so that its inner end projects into the blind hole 26 at the other side of the ferrule. This pin 28 should fit fairly tight in the hub 27 and should be driven far enough so that its outer end clears the root of the thread of the periphery of the ferrule.

In order to facilitate the attachment of the rider 18 to the forks 10 and 11, the rider is preferably made in the form of a stirrup, so that in addition to the cross-bar 19 it has two forks 29 that project upwardly, and the upper ends of these forks are provided with slots 30 extending into them from their upper edges, and these slots or sockets fit to the diameter of the arbor 13. After this stirrup or inverted yoke is put in place, as illustrated in Figure 3, it can be clamped in place by means of a countersunk Allen screw 31 cooperating with a shoulder 32 on the other end of the arbor 13, as illustrated in Figures 1 and 3.

If desired, instead of forming the runner 20 of a disc, I may simply employ a ball 33 that is dropped into a socket 34 in its ferrule 35 from above. In the modification shown in Figure 5 the plane of rotation of wheel 37 is coincident with the pivotal axis of sleeve 8. The upper face of this ball is in a position to be engaged by the concavely formed perimeter 36 at the lower edge of a driving disc 37. The upper portion of this disc 37 is broken away, as illustrated in Figure 5. When this ferrule 35 is mounted in the rider 18 with the upper face of the ball 33 in contact with the lower edge 36 of this disc 37 (which corresponds to the disc 12), the rotation of the driven disc will impart rotation to the ball 33 and assist in causing it to travel along the groove, such as the groove 24 in the templet. The surface of the ball contacts the opposite margins of the groove to center the axis of sleeve 8 directly above the groove. The diameter of the ball member is less than ten times the depth of guide groove 24.

The cooperation of the follower and the groove 24 is illustrated in Figure 1, which illustrates the groove 24 as formed in the upper face of a templet 38. This templet may be a thin plate, thick enough, however, to receive the groove 24. In accordance with my invention, I form this groove 24 by etching it into the plate with chemicals, or if desired by means of a routing tool moving along a line traced around the part that is to be reproduced. In Figure 1 this groove is given a special form to correspond with the form of the part that is to be cut from the plate 29 that constitutes the stock out of which this work-piece is to be cut. In connection with the templet 38, attention is called to the small laterally disposed shoulder or jog 40 formed in the groove 24, and also to the small reentrant throat 41 extending into the interior of the figure beyond a relatively straight edge 42. In accordance with my method, I am enabled to cut a throat 41 such as this on a small radius—even as small as ⅛", or less. The groove 24 is preferably formed with an inlet spur 43, in which the runner 20 is started, and when the runner is started the cutting point 44 of the thermal element 45 is started at one edge of the stock plate 39—for example, at the edge 46. In Figure 1 the piece to be cut out is represented as partially cut along a completed line or cut 47, and the remainder of the outline of the figure which will complete the part to be cut is indicated by the dotted line 48. Plate 38 is supported in a fixed position on the table 49 of the machine; the stock 39 is supported on extension bars 50 between which the cutting point 44 operates, so that when the cut forming the piece is completed the piece can fall out to enable another piece of stock to be put in position. The control bar 3 of machines of this type is usually provided with an extension 3a that can be run out to any desired position, and the bracket 51 that carries the thermal element 45 can be clamped up to this extension 3a by means of a suitable set screw 52. Although Figure 1 shows this extension 3a running out a considerable distance, it is not essential in cutting a small piece such as that illustrated to have the extension extended as far as this.

The hose extensions 53 that supply the oxygen and acetylene gas and the hose 54 for the heater gas are connected up to a header 55 on the machine, from which loops (not illustrated) lead over to the upper end of the thermal element 45.

The arbor 13 may be provided at one side with an elbow 56, which may include a cup for lubricating the bearing for the disc 12. If desired, in some classes of work, I may provide a simple follower point 57 (see Figures 6 and 11) provided with a conical tip or nose 58 to run in a groove, such as the groove 59, illustrated in Figure 9, or a wide U-shaped groove, such as the groove 60 shown in Figure 10. Any desired form of groove may be employed, including the forms of cross-section illustrated also in Figures 7 and 8.

The follower is preferably rotated on its own axis. As illustrated in Figure 6 this may be accomplished by providing a duplex bevel gear 61 driven by pinion 15a on one side and driving a pinion 62 on its other side. The pinion 62 is carried on the upper end of the follower 57.

In order to enable the follower tip 57 to travel automatically along the groove in the templet, I employ a groove 63 having the form of cross-section shown in Figure 11. One side of this groove has the same inclination or slant as the tapered side of the nose 58, the other side of the groove being more greatly inclined so as to provide clearance between it and the nose of the follower. This will cause the follower to travel along the groove always in the same direction.

Although the templet 38 has been described as formed of a metal plate, it should be understood that this templet may be made of wood, plastic, or any other suitable material. When this apparatus is reproducing a shape from a templet, it may operate automatically as some of these machines do, or the follower tip may be held in an operator's hand and guided along the groove at critical points in the groove.

It is obvious that this invention can be practiced with a thermal element or "burner" of any character, such as oxy-acetylene or electric; and also with any type of machine in which a guided part controls the movements of a "tracing" point or thermal element.

Many other embodiments of the invention may be resorted to without departing from the spirit of the invention.

What I claim is:

1. A tracer head for pantographic apparatus adapted to follow the contour of a guide groove in a templet, comprising: a swivel frame having a pivotal axis perpendicular to said templet, a drive wheel journaled in said frame, its plane of rotation coincident with said pivotal axis, the periphery of said drive wheel being treated to provide a driving edge; a ball traction member interposed between the edge of said drive wheel and said templet, said ball traction member adapted to be driven by said drive wheel and engage the opposite margins of said guide groove to center the axis of said swivel frame thereon and to move said tracer head in conformity with the contour of said guide groove.

2. A tracer head for pantographic apparatus adapted to follow the contour of a guide groove in a templet, comprising: a swivel frame having a pivotal axis perpendicular to said templet, a drive wheel journaled in said frame, its plane of rotation coincident with said pivotal axis, the periphery of said drive wheel being treated to provide a driving edge; a rotary ball member interposed between the edge of said drive wheel and said templet, said ball member adapted to engage the opposite margins of said guide groove to center the axis of said swivel frame thereon, said ball member adapted to be driven by said drive wheel and ride in said guide groove to move said tracer frame in conformity with the contour of said guide groove, the diameter of said ball member being less than ten times the depth of said guide groove.

3. In a pantographic thermal cutting apparatus wherein a follower head includes a swivel member which journals a follower wheel and a driving means for said wheel, and wherein a templet having a configurated guide channel therein is employed, the combination of a tracer unit comprising: a frame member passing around the under side of said follower wheel and secured to said follower head, a rotary ball member of small diameter compared to said follower wheel journaled in said frame member and interposed between said follower wheel and said guide channel, said rotary member adapted to be driven by said follower wheel to advance said follower head along the configuration of said guide channel.

CARL N. BOYD.

REFERENCES CITED

The following references are of record in the file of this patent:

UNITED STATES PATENTS

| Number | Name | Date |
| --- | --- | --- |
| 1,981,117 | Oakley | Nov. 20, 1934 |
| 2,207,787 | Eberle | July 16, 1940 |
| 2,032,350 | Burnett | Mar. 3, 1936 |

FOREIGN PATENTS

| Number | Country | Date |
| --- | --- | --- |
| 408,345 | Great Britain | Oct. 20, 1932 |
| 401,494 | Great Britain | Nov. 16, 1933 |